(12) United States Patent
Hardy

(10) Patent No.: US 12,549,809 B2
(45) Date of Patent: *Feb. 10, 2026

(54) CUSTOMIZED COMMERCIAL METRICS AND PRESENTATION VIA INTEGRATED VIRTUAL ENVIRONMENT DEVICES

(71) Applicant: DISH Technologies L.L.C., Englewood, CO (US)

(72) Inventor: Christofer Hardy, Cheyenne, WY (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/643,901

(22) Filed: Dec. 13, 2021

(65) Prior Publication Data

US 2022/0103901 A1    Mar. 31, 2022

Related U.S. Application Data

(63) Continuation of application No. 13/835,292, filed on Mar. 15, 2013, now Pat. No. 11,228,805.

(51) Int. Cl.
| | |
|---|---|
| *H04N 21/442* | (2011.01) |
| *G06Q 30/0242* | (2023.01) |
| *G06Q 30/0251* | (2023.01) |
| *H04N 21/81* | (2011.01) |

(52) U.S. Cl.
CPC ... *H04N 21/44218* (2013.01); *G06Q 30/0242* (2013.01); *G06Q 30/0267* (2013.01); *H04N 21/44204* (2013.01); *H04N 21/44213* (2013.01); *H04N 21/812* (2013.01)

(58) Field of Classification Search
CPC ....... H04N 21/44218; H04N 21/44204; H04N 21/44213; H04N 21/812; G06Q 30/0242; G06Q 30/0267
See application file for complete search history.

(56) References Cited

U.S. PATENT DOCUMENTS

| | | | |
|---|---|---|---|
| 8,402,502 B2 | 3/2013 | Meuninck et al. | |
| 8,544,033 B1 | 9/2013 | Acharya et al. | |
| 8,640,182 B2 | 1/2014 | Bedingfield, Sr. | |
| 8,719,855 B2 | 5/2014 | Bedi | |
| 8,879,155 B1 | 11/2014 | Teller | |
| 8,893,164 B1* | 11/2014 | Teller | G06Q 30/0252 725/12 |
| 8,918,831 B2 | 12/2014 | Meuninck et al. | |
| 8,965,460 B1* | 2/2015 | Rao | H04N 21/41407 455/566 |
| 9,032,470 B2 | 5/2015 | Meuninck et al. | |
| 9,232,274 B2 | 1/2016 | Meuninck et al. | |
| 9,560,406 B2 | 1/2017 | Meuninck et al. | |
| 9,787,974 B2 | 10/2017 | Meuninck et al. | |
| 10,223,859 B2 | 3/2019 | Massing et al. | |
| 2005/0071863 A1* | 3/2005 | Matz | H04N 21/812 725/35 |

(Continued)

*Primary Examiner* — Kunal Langhnoja
(74) *Attorney, Agent, or Firm* — KW Law, LLP

(57) ABSTRACT

A method of providing customized commercial content to a user includes providing first commercial content to a user, determining, using an integrated virtual environment device, whether the user substantially viewed the first commercial content, and providing second commercial content to the user based on the first commercial content and whether the user substantially viewed the first commercial content.

12 Claims, 2 Drawing Sheets

(56) References Cited

U.S. PATENT DOCUMENTS

| | | |
|---|---|---|
| 2005/0235318 A1* | 10/2005 | Grauch .............. H04N 7/17309 |
| | | 725/35 |
| 2007/0168429 A1 | 7/2007 | Apfel et al. |
| 2008/0059994 A1 | 3/2008 | Thornton et al. |
| 2011/0161163 A1 | 6/2011 | Carlson et al. |
| 2011/0221896 A1 | 9/2011 | Haddick et al. |
| 2011/0298702 A1 | 12/2011 | Sakata et al. |
| 2012/0092328 A1 | 4/2012 | Flaks et al. |
| 2012/0113235 A1 | 5/2012 | Shintani |
| 2012/0154277 A1 | 6/2012 | Bar-Zeev et al. |
| 2012/0154557 A1 | 6/2012 | Perez et al. |
| 2012/0293548 A1 | 11/2012 | Perez et al. |
| 2013/0242262 A1 | 9/2013 | Lewis |
| 2013/0293530 A1* | 11/2013 | Perez ................ G06Q 30/0251 |
| | | 345/418 |
| 2014/0040935 A1 | 2/2014 | Gharachorloo et al. |
| 2014/0106710 A1 | 4/2014 | Rodriguez |
| 2014/0253415 A1 | 9/2014 | Hardy et al. |
| 2014/0253694 A1 | 9/2014 | Zustak et al. |
| 2014/0282646 A1 | 9/2014 | Mccoy et al. |
| 2014/0359654 A1 | 12/2014 | Hardy et al. |

\* cited by examiner

CUSTOMIZED COMMERCIAL METRICS AND PRESENTATION VIA INTEGRATED VIRTUAL ENVIRONMENT DEVICES

CROSS-REFERENCE TO RELATED APPLICATION

This application claims priority to the parent U.S. patent application with Ser. No. 13/835,292, entitled CUSTOMIZED COMMERCIAL METRICS AND PRESENTATION VIA INTEGRATED VIRTUAL ENVIRONMENT DEVICES filed on Mar. 15, 2013. The content of the above parent application is incorporated by reference in its entirety.

TECHNICAL FIELD

The present disclosure generally relates to systems and techniques for delivering media content, advertisements, and other content to home entertainment systems. More particularly, the present disclosure relates to the use of integrated virtual environment devices to provide custom commercial content to users.

BACKGROUND

In recent years, it has increasingly become difficult for advertisers to effectively reach viewers. This is due in part to the popularity of digital video recorders and other such devices that allow the user to fast forward through commercials. Furthermore, even when commercial content is displayed to the user, it is not possible to determine whether the user actually viewed the commercial content. That is, the user may choose to leave the environment during the commercial content or may be distracted by other objects or events occurring in the environment. Accordingly, the mere fact that commercial content was provided to a user does not provide an effective indicator of whether that user actually viewed the content.

It is therefore desirable to provide improved systems and methods for determining whether a user has viewed certain commercial content. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements.

DETAILED DESCRIPTION

In general, the embodiments described herein relate to systems and methods for providing customized commercial content to a user by determining, using an integrated virtual environment device (e.g., a wearable computing device), whether the user substantially viewed certain commercial content in the past (e.g., based on user viewing patterns stored in an external "personality server"). In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
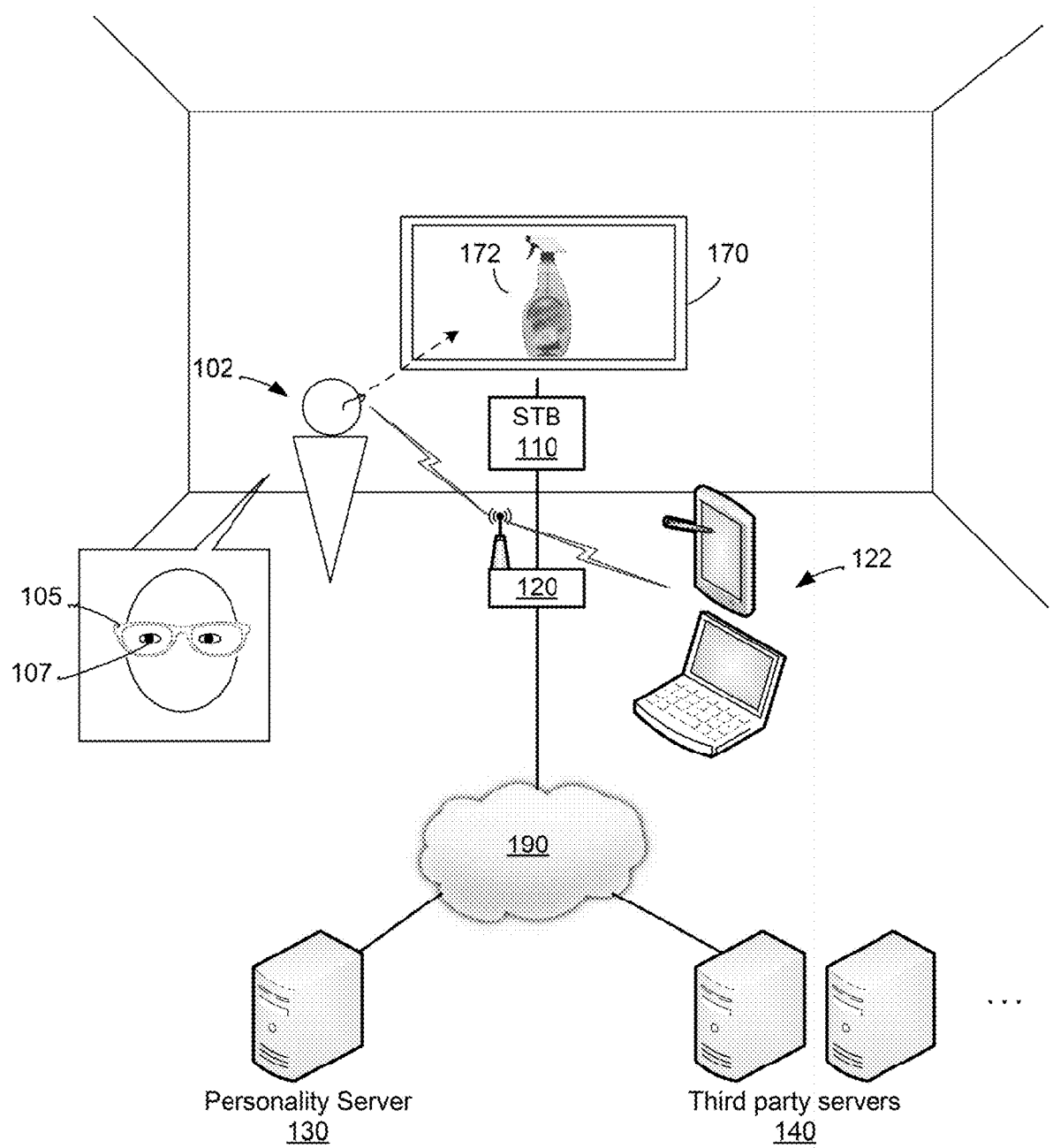
FIG. 1 is a conceptual overview of a content delivery system useful in describing various embodiments.

FIG. 1 presents a conceptual overview of a system in which the present systems and methods may be implemented. As shown, a user 102 is represented schematically as facing a display device 170, for example, a liquid crystal display (LCD), organic light-emitting diode (OLED) display, or other such display. Display device 170 is communicatively coupled (e.g., via any convenient form of wired or wireless communication) to an external component such as a set-top box (STB) 110 and/or other media sources that provide a signal that is processed and ultimately results in an image displayed by the display device 170. At any particular time, the image will typically include media content (e.g., a movie, TV show, or the like) and/or commercial content 172, as illustrated.

Media sources may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. The systems and methods described herein may be implemented in conjunction with a variety of home entertainment devices and/or other media components. For example, the present invention may be implemented in the context of a placeshifting system.

User 102 interacts with some form integrated virtual environment device 105. In general, integrated virtual environment device (or simply "device") 105 comprises any combination of hardware and software capable of determining whether user 102 is, at any particular time, viewing the image (e.g., commercial content 172) presented on display 170. A wide range of devices may be used for this purpose. In recent years, for example, various types of wearable computing devices have become popular, including eyewear that incorporates advanced functionality.

Figure 2:
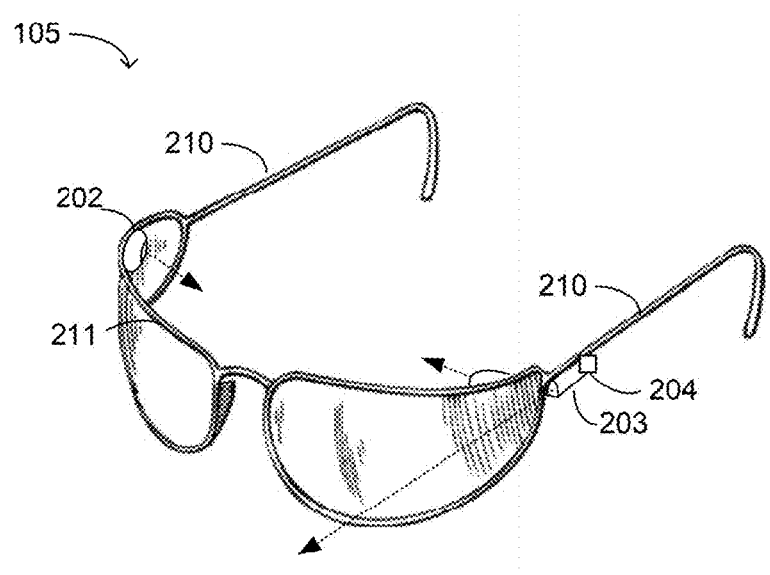
FIG. 2 is a conceptual illustration of an exemplary integrated virtual environment device.

With momentary reference to FIG. 2, for example, device 105 may comprise eyewear (or any other wearable structure) incorporating one or more forward-facing cameras 203 and one or more backward-facing cameras 202 attached to frame front 211, temple components 210, or other portions of the frame. In one embodiment, backward-facing cameras 202 are adapted for tracking the position of one or more of the user's eyes (e.g., eye 107 in FIG. 1) and determining whether the user's eyes are open or closed. Forward facing camera 203 is capable of capturing an image and/or video stream corresponding to whatever is within the user's field of view. Device 105 may also include a microprocessor (204) integrated into the wearable structure, memory, a wireless interface (e.g., Bluetooth, WiFi, etc.), a touch pad, an integrated display screen within the eye-line of the user, an electronic compass, a multi-axis accelerometer, a locationing component (e.g., GPS), as well as other software and hardware traditionally incorporated into mobile computing devices. In general, then, through the use of these components, device 105 is able to determine the direction a user is facing and whether the user is actually watching whatever is within the user's field of view (referred to generally as the user's "viewing patterns."

Referring again to FIG. 1, device 105 is communicatively coupled through one or more networks and/or other communication channels to a personality server 130, which is capable of storing and processing information regarding the viewing patterns of user 102. In one embodiment, as illustrated, device 105 is wirelessly coupled to a conventional IEEE 802.11 (WiFi) access point 120 and/or router that is coupled to network 190 (e.g., the Internet). The embodiments are not so limited, however. Device 102 may, for example, communicate through a Bluetooth connection with a smart-phone or other mobile device, which is then coupled to network 190 through WiFi, a cellular network, or the like. In general, the present embodiments comprehend any architecture that allows device 102 to communicate with personality server 130.

As depicted in FIG. 1, commercial content 172 may be presented to user 102 via display 170. Through the use of device 105 in conjunction with other components of the system, personality server also receives information regarding whether user 102 is viewing or has viewed particular commercial content. That is, device 105 determines whether user 102 is facing display 170 while his eyes are open and tracking commercial content 172. Device 105 may directly determine that display 170 contains commercial content (e.g., via visual cues in the image, etc.), or STB 110 may coordinate with device 105 to determine whether and to what extent user 102 is viewing particular commercial content 172. For example, the video signal provided to display 170 from STB 110 may itself contain metadata or the like that identifies commercial content.

The commercial content itself may be provided, for example, by third party servers 140, which might also receive information regarding the viewing patterns of user 102. Subsequently, user 102 may be presented with additional commercial content based on previous viewing patterns.

During a typical use case, user 102 is presented with commercial content 172—for example, an advertisement for a particular science fiction series. Device 105 determines whether and to what extent the user has viewed that commercial content (i.e., whether display 170 was within the field of view of device 105). For example, it may be determined that user 102 substantially viewed the commercial content (e.g., viewed a substantial proportion of the entire commercial content). The resulting viewing pattern is then communicated to personality server 130. The viewing pattern information may take any suitable form and include a wide range of information. For example, the viewing pattern might simply note that user 102 viewed the advertisement for the science fiction series for at least a predetermined percentage of the total commercial at a particular time.

After storing and processing the viewing patterns for user 102, personality server 130 might then infer that user 102 is generally interested in science fiction, and may then select additional commercial content (e.g., commercial content regarding another science fiction or fantasy show) to be provided to user 102. In some embodiments, the user's viewing patterns are shared with third parties (e.g., via servers 140) which may then pay a fee to the organization associated with personality server 130.

The commercial content may be provided to display 170 and/or other devices operated by user 102, including, for example, mobile devices 122 and device 105 itself. For example, once personality server 130 determines, through the user's viewing patterns, that user 102 will typically watch commercial content relating to science fiction, related commercial content may then be provided to the user through, for example, social networking sites, search engines, e-mail accounts, etc., to which user 102 subscribes and which may be accessed by user 102 via one or more mobile devices 122. Stated another way, the related commercial content may be provided to the user via a different communication channel than that used to provide the first commercial content.

The examples described above are discussed in the context of a device 105 that is worn by user 102. These embodiments are not so limited, however. One or more devices that are external to user 102 (e.g., mounted within the environment) may also be employed to determine whether and to what extent user 102 is viewing commercial content 172.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An integrated virtual environment device comprising:
  a wearable wireless structure;
  a processor integrated into the wearable wireless structure;
  a first camera coupled to the processor that provides a rear-facing camera view to the processor;
  a second camera coupled to the processor that provides a front-facing camera view to the processor;
   wherein the first camera, the second camera and the processor are configured to determine that a user is actively viewing advertising content having one or more visual cues in response to the advertising content being presented in a video stream on a display device that is in a field of view of the user, wherein the field of view of the user is determined based upon eye movements of the user sensed by the first camera, and wherein the video stream having the one or more visual cues is captured by the second camera;
   wherein the processor is configured to transmit information about the advertising content captured by the second camera to an external server that is connected to the wearable wireless structure, wherein the information identifies the one or more visual cues present in the advertising content actively viewed by the user;
   wherein the external server is configured to identify the advertising content based upon the visual cues identified in the commercial content and to infer an interest of the user related to the viewed advertising content based upon the user actively viewing the identified advertising content, wherein the external server is further configured to select additional content for subsequent presentation to the user based on the inferred interest.

2. The integrated virtual environment device of claim 1, further comprises:
  including at least one of an electronic compass, an accelerometer, and a location component communicatively coupled to the processor for determining the information regarding whether a user is actively viewing a set of advertising content within the field of view of the user by performing actions of capturing the set of commercial content while the commercial content is displayed on a display device.

3. The integrated virtual environment device of claim 2, wherein the wearable wireless structure comprises an eyeglass frame that is integrated with at least the first camera.

4. The integrated virtual environment device of claim 3, wherein the wearable wireless structure comprises the eyeglass frame that is integrated with at least a second camera to determine whether a display by a display device of the commercial content is within the field of view of the user using an eye-tracking component that identifies the eye movements of the user.

5. The integrated virtual environment device of claim 4, further including an interface configured to at least a Bluetooth standard to communicatively coupled to the processor to communicate wirelessly with the server.

6. An automated process performed by an integrated virtual environment device configured to detect viewing of commercial content provided in a video stream on a display device while the integrated virtual environment device is being worn by a user, wherein the integrated virtual environment device comprises a forward-facing camera and a rear-facing camera that monitors eye movements of the user viewing the display device, wherein the automated process comprises:
  capturing, with the forward-facing camera of the integrated virtual environment device, at least a portion of the video stream provided on the display device that comprises the commercial content;
  identifying, by the integrated virtual environment device, the commercial content based upon visual cues in the video stream provided on the display device;
  detecting, by the rear-facing camera based upon eye movements of the user detected by the rear-facing camera, that the display device providing the video stream is within a field of view of the user so that the user is actually watching the commercial content;
  inferring, in response to the eye movements of the user indicating that the user is actually viewing the commercial content having the visual cues on the display device, an interest of the user related to the identified commercial content; and
  selecting additional content for the user based upon the inferred interest of the user.

7. The automated process of claim 6, further comprising: wherein the inferring is performed by a personality server that is used to determine a viewing pattern of the user.

8. The automated process of claim 7, further comprising: determining, by the personality server, based on the viewing pattern of the user a genre of commercial content that is watched by the user.

9. The automated process of claim 8, further comprising: determining, by the personality server, based on the viewing pattern of the user the genre of commercial content that is watched by the user.

10. The automated process of claim 9, further comprising: in response to a determination of the genre of commercial content, targeting by the personality server, the additional content to the user using at least a social networking.

11. The automated process of claim 10, further comprising: inferring, by the personality server, the commercial content for providing to the user based on the viewing pattern of the user and the interest for sharing to a third-party server for commercialization.

12. The automated process of claim 6, further comprising: presenting the user with additional commercial content on the display device of the integrated virtual environment based on previous viewing patterns.

* * * * *